(12) United States Patent
Sigler et al.

(10) Patent No.: US 12,012,542 B2
(45) Date of Patent: Jun. 18, 2024

(54) FLAME RETARDANT ROTOMOLDED POLYOLEFIN

(71) Applicant: BASF SE, Ludwigshafen (DE)

(72) Inventors: John A. Sigler, Plainsboro, NJ (US); Thomas F. Thompson, Colonia, NJ (US); Stephen Mark Andrews, Richmond, VA (US)

(73) Assignee: BASF SE, Ludwigshafen (DE)

( * ) Notice: Subject to any disclaimer, the term of this patent is extended or adjusted under 35 U.S.C. 154(b) by 937 days.

(21) Appl. No.: 16/967,612

(22) PCT Filed: Feb. 20, 2019

(86) PCT No.: PCT/US2019/018711
§ 371 (c)(1),
(2) Date: Aug. 5, 2020

(87) PCT Pub. No.: WO2019/168718
PCT Pub. Date: Sep. 6, 2019

(65) Prior Publication Data
US 2021/0087471 A1    Mar. 25, 2021

Related U.S. Application Data

(60) Provisional application No. 62/635,764, filed on Feb. 27, 2018.

(51) Int. Cl.
| | | |
|---|---|---|
| C09K 21/12 | (2006.01) |
| B29C 41/04 | (2006.01) |
| B29K 23/00 | (2006.01) |
| B29K 105/00 | (2006.01) |
| C08K 5/3435 | (2006.01) |
| C08K 5/3492 | (2006.01) |
| C08K 5/5357 | (2006.01) |

(52) U.S. Cl.
CPC ............ *C09K 21/12* (2013.01); *C08K 5/3435* (2013.01); *C08K 5/34924* (2013.01); *C08K 5/34926* (2013.01); *C08K 5/5357* (2013.01); *B29C 41/042* (2013.01); *B29K 2023/0633* (2013.01); *B29K 2105/0026* (2013.01); *C08K 2201/005* (2013.01); *C08K 2201/014* (2013.01)

(58) Field of Classification Search
CPC .... C08K 5/32; C08K 5/5357; C08K 5/34928; C08L 23/06
See application file for complete search history.

(56) References Cited

U.S. PATENT DOCUMENTS

| | | |
|---|---|---|
| 8,357,324 B2 | 1/2013 | Yu et al. |
| 2002/0156162 A1 | 10/2002 | Stadler |
| 2006/0079612 A1 | 4/2006 | Troutman et al. |
| 2011/0092623 A1 | 4/2011 | Yamanaka et al. |
| 2011/0257310 A1 | 10/2011 | Butz |
| 2012/0225980 A1 | 9/2012 | Parsons |

FOREIGN PATENT DOCUMENTS

| | | |
|---|---|---|
| CN | 1269378 A | 10/2000 |
| GB | 2373507 | 9/2002 |
| WO | 2017013028 | 1/2017 |
| WO | 2017013028 A1 | 1/2017 |

OTHER PUBLICATIONS

Supplementary European Search Report on European Patent Application No. 19760143, dated Aug. 11, 2021, 98 pgs.
Office Action Report on Chinese Patent Application for Invention No. 201980015477.8, dated Jan. 6, 2022, 7 pages.
International Search Report and Written Opinion for International Application No. PCT/US2019/018711 dated May 8, 2019, 10 pages.

*Primary Examiner* — Robert T Butcher
(74) *Attorney, Agent, or Firm* — Element IP, PLC

(57) ABSTRACT

Polyolefin hollow articles prepared via a rotomolding process are provided flame retardancy by incorporating therein a phosphonate ester, an N-alkoxy hindered amine and melamine cyanurate.

13 Claims, No Drawings

FLAME RETARDANT ROTOMOLDED POLYOLEFIN

CROSS-REFERENCE TO RELATED APPLICATION(S)

This application is a national phase entry under 35 U.S.C. § 371 of International Application No. PCT/US2019/018711, filed on Feb. 20, 2019, which claims the benefit of U.S. Provisional Patent Application No. 62/635,764, filed on Feb. 27, 2018. The contents of these applications are hereby incorporated by reference in their entirety.

The disclosure is directed to flame retardant polyolefin compositions prepared by a rotomolding process.

BACKGROUND

Rotational molding (rotomolding) is a manufacturing process in which hollow plastic articles are prepared. In general, a plastic material is filled into one half of a mold which is then closed with the other half. The closed mold is heated and rotated around different axes, wherein molten polymer coats the interior of the mold—a process referred to as "sintering". The mold is then cooled and the molded article removed. The process may require temperatures of greater than about 300° C. or even greater than about 400° C.

The rotomolding process may be employed to prepare articles such as storage tanks for water, oil and the like; kayaks, toys, refuse containers, equipment housings, etc. Typically, a rotomolding process employs a polyolefin substrate, for instance polyethylene. Flame retardancy is a particular concern for many of the articles produced by the rotomolding process.

Conventional flame retardants are generally employed at high loadings, which may result in a severe reduction in desired mechanical properties of rotomolded parts, such as impact strength and ductility. Also, rotomolded articles are relatively thick, which also contributes to difficulty in finding effective flame retardants. Furthermore, high levels of flame retardants may interfere with the plastic sintering process.

SUMMARY

Accordingly, disclosed is a flame-retardant hollow plastic article comprising a polyolefin substrate, the polyolefin substrate having incorporated therein a phosphonate ester, an N-alkoxy hindered amine and melamine cyanurate.

Also disclosed is a flame retardant additive mixture comprising a phosphonate ester, an N-alkoxy hindered amine and melamine cyanurate, wherein a weight/weight ratio of phosphonate ester to melamine cyanurate is from about 7/1 to about 1/1 and a weight/weight ratio of melamine cyanurate to N-alkoxy hindered amine is from about 8/1 to about 1/1.

Also disclosed is a process for the production of a hollow plastic article, the process comprising incorporating into a polyolefin substrate a phosphonate ester, an N-alkoxy hindered amine and melamine cyanurate to provide a fully formulated polyolefin mixture, adding the mixture to a mold, heating the mold to a temperature of greater than 280° C., rotating the mold about at least 2 axes, wherein molten polyolefin mixture coats the interior of the mold, cooling the mold while still rotating, opening the mold and removing the formed hollow article.

DETAILED DISCLOSURE

In certain embodiments, a polyolefin substrate comprises a polyethylene. Polyethylene includes, for example, high density polyethylene (HDPE), high molecular weight high density polyethylene (HMW HDPE), ultrahigh molecular weight high density polyethylene (UHMW HDPE), medium density polyethylene (MDPE), low density polyethylene (LDPE), linear low density polyethylene (LLDPE), branched low density polyethylene (BLDPE) or polyethylenes and ethylene copolymers prepared using Phillips catalysts and polyethylene blends. Ethylene copolymers may contain differing proportions of comonomers. In some embodiments, comonomers include 1-olefins such as propene, 1-butene, 1-pentene, 1-hexene, 1-heptene, 1-octene or isobutylene, styrene, cycloolefins such as cyclopentene, cyclohexene or norbornene or dienes such as butadiene, isoprene, 1,4-hexadiene, cyclopentadiene, dicyclopentadiene, norbornadiene or ethylidenenorbornene.

Polyolefin substrates also include polyethylene blends with polyolefins. Examples include mixtures of polyethylene with polypropylene (PP) and mixtures of various PE types, for example mixtures including two or more of high density polyethylene (HDPE), high molecular weight high density polyethylene (HMW HDPE), ultrahigh molecular weight high density polyethylene (UHMW HDPE), medium density polyethylene (MDPE), low density polyethylene (LDPE), linear low density polyethylene (LLDPE), branched low density polyethylene (BLDPE) or ethylene-propylene-diene terpolymers (EPDM) containing high proportions of diene. Certain embodiments of polymer mixtures include, for example, PP/HDPE, PP/LLDPE, and LLDPE/HDPE as well as ternary mixtures such as PP/HDPE/LLDPE. In certain embodiments, polymers can be linear or branched and can be formulated with or without crosslinking (e.g., chemical crosslinking).

The polyolefin substrate may have other polymers incorporated therein, for example polystyrene, polyamide, polyester, polycarbonate, epoxy resins, polyurethane, copolymers thereof (e.g., random or block copolymers) or mixtures thereof. In some embodiments, such "other" polymers may be present in a finished article from any of about 1 wt % (weight percent), about 2 wt %, about 3 wt %, about 4 wt %, about 5 wt %, about 6 wt % or about 7 wt % to any of about 8 wt %, about 9 wt %, about 10 wt %, about 11 wt %, about 12 wt %, about 13 wt %, about 14 wt % or about 15 wt %, based on the total weight of the finished article.

In some embodiments, the phosphonate ester is of formula

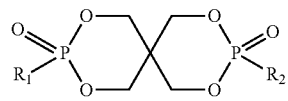

wherein $R_1$ and $R_2$ are independently alkyl, substituted alkyl, aralkyl, substituted aralkyl, aryl or substituted aryl.

In certain embodiments, $R_1$ and $R_2$ are independently benzyl or $C_1$-$C_{10}$ straight or branched chain alkyl. In some embodiments, $R_1$ and $R_2$ are independently benzyl or $C_1$-$C_4$ straight or branched chain alkyl. In other embodiments, $R_1$ and $R_2$ are independently benzyl or methyl. A phosphonate ester wherein $R_1$ and $R_2$ are methyl is commercially available as AFLAMMIT PCO 960.

N-alkoxy hindered amines include one or more moieties of formula

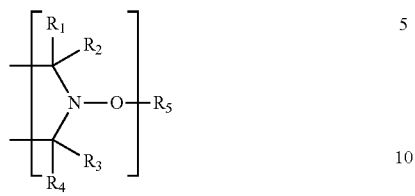

(5)

wherein $R_1$, $R_2$, $R_3$ and $R_4$ are each independently $C_1$-$C_8$alkyl or $R_1$ and $R_2$ together and/or $R_3$ and $R_4$ together with the linking carbon form cyclohexyl and $R_5$ is a hydrocarbyl group.

In some embodiments, $R_5$ is propyl, octyl, 2-hydroxy-2-methylpropyl, decyl, undecyl, dodecyl, cyclohexyl or a hydrocarbyl containing from 50 to 1000 carbon atoms. In certain embodiments, each of $R_1$, $R_2$, $R_3$ and $R_4$ are methyl.

In certain embodiments, an N-alkoxy hindered amine is selected from a group consisting of formula (1) through (9):

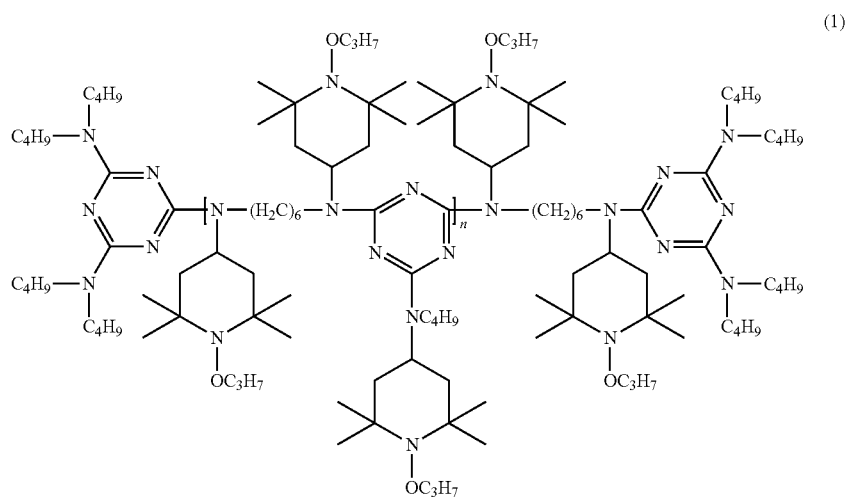

(1)

wherein n is an integer from 1 to 15 or is an integer from 1 to 10 or from 1 to 5;

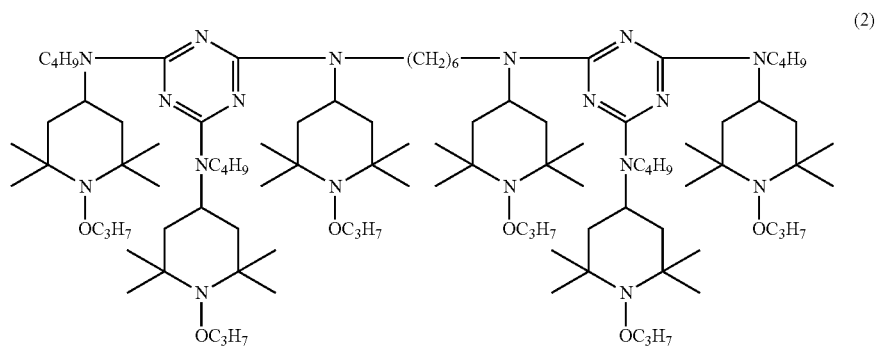

(2)

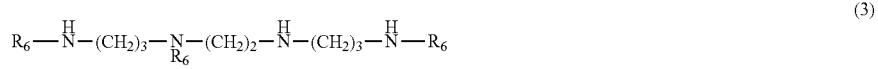

(3)

wherein $R_6$ is a group of formula

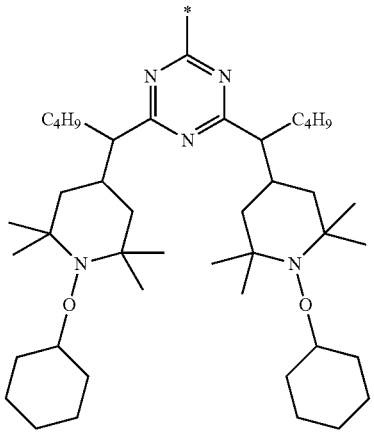

wherein * is the point of attachment;

(4)

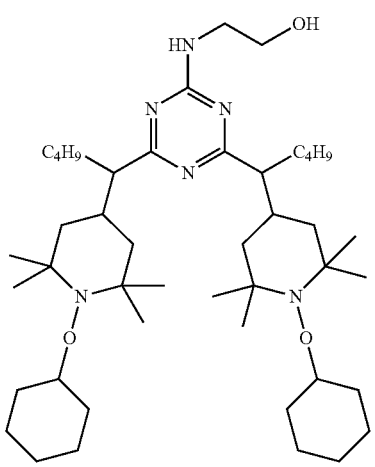

(5)

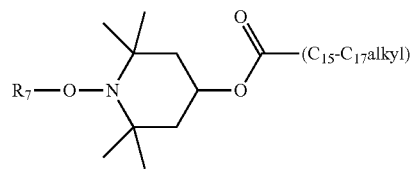

wherein $R_7$ is $C_1$-$C_{18}$alkyl or $C_1$-$C_{18}$hydroxyalkyl;

(6)

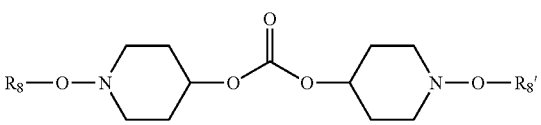

wherein $R_8$ and $R_8'$ are independently $C_1$-$C_{30}$alkyl;

(7)

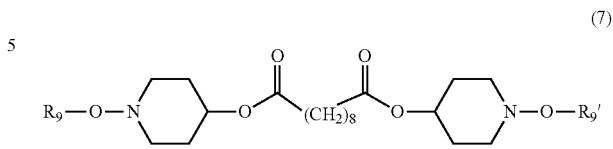

wherein $R_9$ and $R_9'$ are independently $C_1$-$C_{30}$ alkyl or cylclohexyl;

(8)

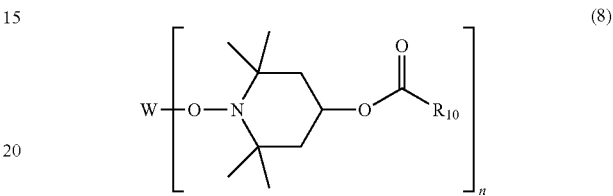

wherein
n is an integer of from any of 1, 2, 3 or 4 to any of 5, 6, 7, 8, 9 or 10,
$R_{10}$ is $C_1$-$C_{40}$alkyl and
W is hydrocarbyl containing from 50 to 1000 carbon atoms;

(9)

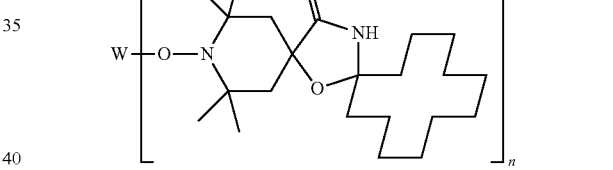

wherein
n is an integer from any of 1, 2, 3, 4, 5, 6, 7 or 8 to any of 9, 10, 11, 12, 15, 18, 21, 24, 27, 30, 33, 36, 39, 42, 45, 47 or 50 and
W is a hydrocarbyl containing from 50 to 1000 carbon atoms.

In some embodiments, in compounds of formula (5), $R_7$ is $C_1$-$C_4$alkyl or $C_1$-$C_4$hydroxyalkyl. In certain embodiments, $R_7$ is 2-hydroxy-2-methylpropyl. For example, a compound of formula (5) in certain embodiments is 1-(2-hydroxy-2-methylpropoxy)-4-octadecanoyloxy-2,2,6,6-tetramethylpiperidine.

In some embodiments, in compounds of formula (6), $R_8$ and $R_8'$ are independently $C_1$-$C_{20}$alkyl or $C_8$-$C_{20}$alkyl. In certain embodiments, $R_8$ and $R_8'$ are independently decyl, undecyl, or dodecyl.

In some embodiments, in compounds of formula (7), $R_9$ and $R_9'$ are independently $C_1$-$C_{10}$alkyl or cyclohexyl. In a certain embodiment, $R_9$ and $R_9'$ are octyl.

In a certain embodiment, in compounds of formula (8), $R_5$ is $C_{11}$-$C_{20}$alkyl.

In some embodiments, in compounds of formula (8) and (9), W is a hydrocarbyl of from 50 carbon atoms to 500 carbon atoms or to 800 carbon atoms.

In some embodiments, N-alkoxy hindered amines contain one or more moieties of formula

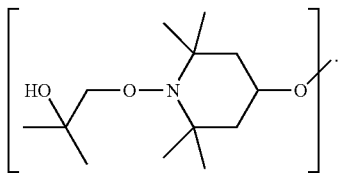

In some embodiments, N-alkoxy hindered amines contain one or more moieties of formula

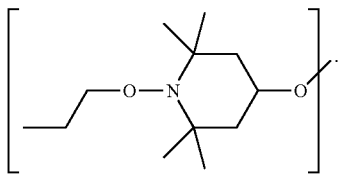

In some embodiments, N-alkoxy hindered amines contain one or more moieties of formula

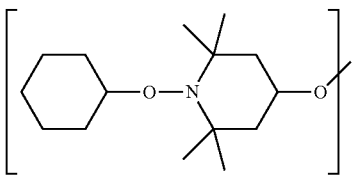

Alkyl groups may be linear or branched and may include methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, iso-heptyl, 1,1,3,3-tetramethylbutyl, 1-methylheptyl, 3-methylheptyl, n-octyl, tert-octyl, 2-ethylhexyl, 1,1,3-trimethylhexyl, 1,1,3,3-tetramethylpentyl, nonyl, decyl, undecyl, 1-methylundecyl and dodecyl.

Aralkyl may be a $C_7$-$C_{12}$ aralkyl, for example benzyl or cumyl. Aryl includes for instance phenyl and naphthyl. When substituted, alkyl, aryl or aralkyl may in some embodiments be substituted by one or more $C_1$-$C_4$ alkyl, hydroxyl, carboxylic, amino or thiol groups.

Hydrocarbyl is any hydrocarbon containing group, for example straight or branched chain alkyl or alkenyl which may be interrupted by or substituted by one or more heteroatom-containing groups or aryl groups, for instance interrupted by one or more —O—, —NH— or —C(O)O— groups and/or substituted by one or more hydroxyl, carboxylic, amino, thiol, phosphonate or aryl groups.

Melamine cyanurate is a salt formed from melamine and cyanuric acid, and may be obtained, for example, by the reaction of about equimolar quantities of melamine and cyanuric acid. Melamine cyanurate is commercially available, for example, as MELAPUR MC (BASF). Melamine cyanurate may have an average particle size of less than about 50 microns, in some embodiments less than about 35 microns; and in certain embodiments about 25 microns or less. For example, melamine cyanurate in some embodiments may have a D50 particle size of from any of about 1 μm, about 2 μm, about 3 μm, about 4 μm, about 5 μm, about 6 μm, about 7 μm, about 8 μm or about 9 μm to any of about 10 μm, about 12 μm, about 15 μm, about 18 μm, about 21 μm, about 24 μm, about 27 μm, about 30 μm, about 33 μm, about 36 μm, about 39 μm or about 42 μm.

According to the invention, particle size is synonymous with particle diameter and is determined for instance by scanning electron microscopy (SEM) or transmission electron microscopy (TEM). Average particle size is synonymous with D50, meaning half of the population resides above this point, and half below. Particle size refers to primary particles. Particle size may be measured by laser light scattering techniques, with dispersions or dry powders.

Present hollow articles may in some embodiments comprise a phosphonate ester from any of about 4 wt %, about 5 wt %, about 6 wt %, about 7 wt %, about 8 wt %, about 9 wt % or about 10 wt % to any of about 11 wt %, about 12 wt %, about 13 wt %, about 14 wt %, about 15 wt %, about 16 wt/o, about 17 wt %, about 18 wt %, about 19 wt % or about 20 wt %, based on the total weight of the article.

In some embodiments, the hollow articles may comprise an N-alkoxy hindered amine from any of about 0.1 wt %, about 0.3 wt %, about 0.6 wt %, about 0.9 wt %, about 1.0 wt %, about 1.3 wt % or about 1.6 wt % to any of about 1.8 wt %, about 2.0 wt %, about 2.3 wt %, about 2.6 wt %, about 2.9 wt %, about 3.2 wt %, about 3.5 wt %, about 3.8 wt %, about 4.1 wt %, about 4.4 wt %, about 4.7 or about 5.0 wt %, based on the total weight of the article.

In some embodiments, the hollow articles may comprise melamine cyanurate from any of about 1.0 wt %, about 1.3 wt %, about 1.6 wt %, about 1.9 wt %, about 2.0 wt %, about 2.3 wt % or about 2.6 wt %, about 2.8 wt %, about 3.0 wt %, about 3.3 wt %, about 3.6 wt %, about 3.9 wt %, about 4.2 wt %, about 4.5 wt %, about 4.8 wt % or about 5.1 wt % to any of about 5.4 wt %, about 5.7, about 6.0 wt %, about 6.3 wt %, about 6.6 wt %, about 6.9 wt %, about 7.2 wt %, about 7.5 wt %, about 7.8 wt %, about 8.1 wt %, about 8.4 wt %, about 8.7 wt %, about 9.0 wt %, about 9.3 wt %, about 9.6 wt % or about 10.0 wt %, based on the total weight of the article.

In certain embodiments, a weight/weight ratio of phosphonate ester to melamine cyanurate is from any of about 7/1, about 6/1, about 5/1 or about 4/1 to any of about 3/1, about 2/1 or about 1/1.

In some embodiments, a weight/weight ratio of melamine cyanurate to N-alkoxy (NOR) hindered amine is from any of about 8/1, about 7/1, about 6/1 or about 5/1 to any of about 4/1, about 3/1, about 2/1 or about 1/1.

In some embodiments, the hollow articles comprise the polyolefin substrate from any of about 50 wt %, about 55 wt %, about 60 wt %, about 65 wt %, about 70 wt %, about 73 wt %, about 76 wt %, about 79 wt % or about 82 wt % to any of about 85 wt %, about 88 wt %, about 90 wt %, about 93 wt % or about 95 wt %, based on the total weight of the article.

In some embodiments, one or more further additives may be incorporated into the hollow articles of the invention. Further additives include one or more additives selected from a group consisting of ultraviolet light absorbers (UVAs), further hindered amine stabilizers and antioxidants.

Ultraviolet (UV) light absorbers may be selected from a group consisting of hydroxyphenylbenzotriazole, tris-aryl-s-triazine, hydroxybenzoate, 2-hydroxybenzophenone and cyanoacrylate ultraviolet light absorbers (UVAs).

Hydroxyphenylbenzotriazole UVAs are for instance disclosed in U.S. Pat. Nos. 3,004,896; 3,055,896; 3,072,585; 3,074,910; 3,189,615; 3,218,332; 3,230,194; 4,127,586; 4,226,763; 4,275,004; 4,278,589; 4,315,848; 4,347,180;

4,383,863; 4,675,352; 4,681,905; 4,853,471; 5,268,450; 5,278,314; 5,280,124; 5,319,091; 5,410,071; 5,436,349; 5,516,914; 5,554,760; 5,563,242; 5,574,166; 5,607,987, 5,977,219 and 6,166,218, such as 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-α-cumyl-2-hydroxyphenyl)-2H-benzotriazole, 2-(3-t-butyl-2-hydroxy-5-(2-(o-hydroxy-octa-(ethyleneoxy)carbonyl-ethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-L-cumyl-phenyl)-2H-benzotriazole, 5-chloro-2-(2-hydroxy-3,5-di-α-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzo-triazole, methyl 3-(5-trifluoromethyl-2H-benzotriazol-2-yl)-5-t-butyl-4-hydroxy-hydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5-di-t-butylphenyl)-2H-benzotriazole, 5-trifluoromethyl-2-(2-hydroxy-3,5-di-L-cumylphenyl)-2H-benzotriazole, 5-butylsulfonyl-2-(2-hydroxy-3,5-di-t-butyl-phenyl)-2H-benzotriazole and 5-phenylsulfonyl-2-(2-hydroxy-3,5-di-t-butylphenyl)-2H-benzotriazole.

Tris-aryl-s-triazine UVAs are for instance those disclosed in U.S. Pat. Nos. 3,843,371; 4,619,956; 4,740,542; 5,096, 489; 5,106,891; 5,298,067; 5,300,414; 5,354,794; 5,461, 151; 5,476,937; 5,489,503; 5,543,518; 5,556,973; 5,597, 854; 5,681,955; 5,726,309; 5,736,597; 5,942,626; 5,959, 008; 5,998,116; 6,013,704; 6,060,543; 6,242,598 and 6,255, 483, for example 4,6-bis-(2,4-dimethylphenyl)-2-(2-hydroxy-4-octyloxyphenyl)-s-triazine, CYASORB 1164, 4,6-bis-(2,4-dimethylphenyl)-2-(2,4-dihydroxyphenyl)-s-triazine, 2,4-bis(2,4-dihydroxyphenyl)-6-(4-chlorophenyl)-s-triazine, 2,4-bis[2-hydroxy-4-(2-hydroxyethoxy)phenyl]-6-(4-chlorophenyl)-s-triazine, 2,4-bis[2-hydroxy-4-(2-hydroxy-4-(2-hydroxyethoxy)phenyl]-6-(2,4-dimethylphenyl)-s-triazine, 2,4-bis[2-hydroxy-4-(2-hydroxyethoxy)phenyl]-6-(4-bromophenyl)-s-triazine, 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine, 2,4-bis(4-biphenylyl)-6-(2-hydroxy-4-octyloxycarbonylethylidene-oxyphenyl)-s-triazine, 2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-triazine, 2,4-bis(2, 4-dimethyl-phenyl)-6-[2-hydroxy-4-(3-benzyloxy-2-hydroxypropyloxy)phenyl]-s-triazine, 2,4-bis(2-hydroxy-4-n-butyloxyphenyl)-6-(2,4-di-n-butyloxyphenyl)-s-triazine, 2,4-bis(2,4-dimethyl-phenyl)-6-[2-hydroxy-4-(3-nonyloxy*-2-hydroxypropyloxy)-5-α-cumylphenyl]-s-triazine (* denotes a mixture of octyloxy, nonyloxy and decyloxy groups), methylenebis-{2,4-bis(2,4-dimethylphenyl)-6-[2-hydroxy-4-(3-butyloxy-2-hydroxypropoxy)phenyl]-s-triazine}, methylene bridged dimer mixture bridged in the 3:5', 5:5' and 3:3' positions in a 5:4:1 ratio, 2,4,6-tris(2-hydroxy-4-isooctyloxycarbonylisopropylideneoxyphenyl)-s-triazine, 2,4-bis(2,4-dimethyl-phenyl)-6-(2-hydroxy-4-hexyloxy-5-α-cumylphenyl)-s-triazine, 2-(2,4,6-trimethylphenyl)-4,6-bis[2-hydroxy-4-(3-butyloxy-2-hydroxypropyloxy)phenyl]-s-triazine, 2,4,6-tris[2-hydroxy-4-(3-sec-butyloxy-2-hydroxypropyloxy)phenyl]-s-triazine, mixture of 4,6-bis-(2, 4-dimethylphenyl)-2-(2-hydroxy-4-(3-dodecyloxy-2-hydroxypropoxy)-phenyl)-s-triazine and 4,6-bis-(2,4-dimethylphenyl)-2-(2-hydroxy-4-(3-tridecyloxy-2-hydroxypropoxy)-phenyl)-s-triazine, TINUVIN 400, 4,6-bis-(2,4-dimethylphenyl)-2-(2-hydroxy-4-(3-(2-ethylhexyloxy)-2-hydroxypropoxy)-phenyl)-s-triazine and 4,6-diphenyl-2-(4-hexyloxy-2-hydroxyphenyl)-s-triazine.

Hydroxybenzoate UV absorbers are for instance esters of substituted and unsubstituted benzoic acids, as for example 4-tert-butylphenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2-Hydroxybenzophenone UV absorbers are for example the 4-hydroxy, 4-methoxy, 4-octyloxy, 4-decyloxy, 4-dodecyloxy, 4-benzyloxy, 4,2',4'-trihydroxy and 2'-hydroxy-4, 4'-dimethoxy derivatives.

Cyanoacrylate UV absorbers are for instance pentaerythritol tetrakis(2-cyano-3,3-diphenylacrylate), α-cyano-β,β-diphenylacrylic acid ethyl ester or isooctyl ester and α-cyano-β-methyl-p-methoxy-cinnamic acid methyl ester or butyl ester.

Many of the UVAs are commercial, for example TINUVIN 326, TINUVIN 234, TINUVIN 1577, TINUVIN 1600, CYASORB UV 1164, CYASORB THT, CYASORB UV 2908, CHIMASSORB 81, UVINUL 3030, etc.

Ultraviolet light absorbers may be present, in total, from any of about 0.20 wt %, about 0.25 wt %, about 0.30 wt %, about 0.35 wt %, about 0.40 wt %, about 0.45 wt %, about 0.50 wt %, about 0.55 wt %, about 0.60 wt %, about 0.65 wt %, about 0.70 wt % or about 0.75 wt % to any of about 0.80 wt %, about 0.85 wt %, about 0.90 wt %, about 0.95 wt %, about 1.0 wt %, about 1.2 wt %, about 1.5 wt %, about 1.7 wt % or about 2.0 wt %, based on the total weight of the hollow article.

Hindered amine light stabilizers (HALS) are disclosed for example in US2015/0284535 and U.S. Pat. Nos. 5,004,770, 5,204,473, 5,096,950, 5,300,544, 5,112,890, 5,124,378, 5,145,893, 5,216,156, 5,844,026, 5,980,783, 6,046,304, 6,117,995, 6,271,377, 6,297,299, 6,392,041, 6,376,584 and 6,472,456.

Hindered amine light stabilizers include for example:
(1) 1-cyclohexyloxy-2,2,6,6-tetramethyl-4-octadecylaminopiperidine,
(2) bis(2,2,6,6-tetramethylpiperidin-4-yl) sebacate,
(3) bis(1-acetoxy-2,2,6,6-tetramethylpiperidin-4-yl) sebacate,
(4) bis(1,2,2,6,6-pentamethylpiperidin-4-yl) sebacate,
(5) bis(1-cyclohexyloxy-2,2,6,6-tetramethylpiperidin-4-yl) sebacate,
(6) bis(1-octyloxy-2,2,6,6-tetramethylpiperidin-4-yl) sebacate;
(7) bis(1-acyl-2,2,6,6-tetramethylpiperidin-4-yl) sebacate,
(8) bis(1,2,2,6,6-pentamethyl-4-piperidyl) n-butyl-3,5-di-tert-butyl-4-hydroxybenzylmalonate
(9) 2,4-bis[(1-cyclohexyloxy-2,2,6,6-tetramethylpiperidin-4-yl)butylamino]-6-(2-hydroxyethyl amino-s-triazine,
(10) bis(1-cyclohexyloxy-2,2,6,6-tetramethylpiperidin-4-yl) adipate,
(11) 2,4-bis[(1-cyclohexyloxy-2,2,6,6-piperidin-4-yl)butylamino]-6-chloro-s-triazine,
(12) 1-(2-hydroxy-2-methylpropoxy)-4-hydroxy-2,2,6,6-tetramethylpiperidine,
(13) 1-(2-hydroxy-2-methylpropoxy)-4-oxo-2,2,6,6-tetramethylpiperidine,
(14) 1-(2-hydroxy-2-methylpropoxy)-4-octadecanoyloxy-2,2,6,6-tetramethylpiperidine,
(15) bis(1-(2-hydroxy-2-methylpropoxy)-2,2,6,6-tetramethylpiperidin-4-yl) sebacate,
(16) bis(1-(2-hydroxy-2-methylpropoxy)-2,2,6,6-tetramethylpiperidin-4-yl) adipate,
(17) 2,4-bis{N-[1-(2-hydroxy-2-methylpropoxy)-2,2,6,6-tetramethylpiperidin-4-yl]-N-butyl-amino}-6-(2-hydroxyethylamino)-s-triazine,
(18) 4-benzoyl-2,2,6,6-tetramethylpiperidine,
(19) di-(1,2,2,6,6-pentamethylpiperidin-4-yl) p-methoxybenzylidenemalonate,
(20) 2,2,6,6-tetramethylpiperidin-4-yl octadecanoate,
(21) bis(1-octyloxy-2,2,6,6-tetramethylpiperidyl) succinate,
(22) 1,2,2,6,6-pentamethyl-4-aminopiperidine,
(23) 2-undecyl-7,7,9,9-tetramethyl-1-oxa-3,8-diaza-4-oxospiro[4,5]decane,
(24) tris(2,2,6,6-tetramethyl-4-piperidyl) nitrilotriacetate,
(25) tris(2-hydroxy-3-(amino-(2,2,6,6-tetramethylpiperidin-4-yl)propyl) nitrilotriacetate,
(26) tetrakis(2,2,6,6-tetramethyl-4-piperidyl)-1,2,3,4-butane-tetracarboxylate,
(27) tetrakis(1,2,2,6,6-pentamethyl-4-piperidyl)-1,2,3,4-butane-tetracarboxylate,
(28) 1,1'-(1,2-ethanediyl)-bis(3,3,5,5-tetramethylpiperazinone),
(29) 3-n-octyl-7,7,9,9-tetramethyl-1,3,8-triazaspiro[4.5]decan-2,4-dione,
(30) 8-acetyl-3-dodecyl-7,7,9,9-tetramethyl-1,3,8-triazaspiro[4.5]decane-2,4-dione,
(31) 3-dodecyl-1-(2,2,6,6-tetramethyl-4-piperidyl)pyrrolidin-2,5-dione,
(32) 3-dodecyl-1-(1,2,2,6,6-pentamethyl-4-piperidyl)pyrrolidine-2,5-dione,
(33) N,N'-bis-formyl-N,N'-bis(2,2,6,6-tetramethyl-4-piperidyl)hexamethylenediamine,
(33a) bis(1-undecanyloxy-2,2,6,6-tetramethylpiperidin-4-yl)carbonate,
(34) reaction product of 2,4-bis[(1-cyclohexyloxy-2,2,6,6-piperidin-4-yl)butylamino]-6-chloro-s-triazine with N,N'-bis(3-aminopropyl)ethylenediamine),
(35) condensate of 1-(2-hydroxyethyl)-2,2,6,6-tetramethyl-4-hydroxypiperidine and succinic acid,
(36) condensate of N,N'-bis(2,2,6,6-tetramethyl-4-piperidyl)-hexamethylenediamine and 4-tert-octylamino-2,6-dichloro-1,3,5-triazine,
(37) condensate of N,N'-bis(2,2,6,6-tetramethyl-4-piperidyl)-hexamethylenediamine and 4-cyclohexylamino-2,6-dichloro-1,3,5-triazine,
(38) condensate of N,N'-bis-(2,2,6,6-tetramethyl-4-piperidyl)hexamethylenediamine and 4-morpholino-2,6-dichloro-1,3,5-triazine,
(39) condensate of N,N'-bis-(1,2,2,6,6-pentamethyl-4-piperidyl)hexamethylenediamine and 4-morpholino-2,6-dichloro-1,3,5-triazine,
(40) condensate of 2-chloro-4,6-bis(4-n-butylamino-2,2,6,6-tetramethylpiperidyl)-1,3,5-triazine and 1,2-bis(3-aminopropylamino)ethane,
(41) condensate of 2-chloro-4,6-di-(4-n-butylamino-1,2,2,6,6-pentamethylpiperidyl)-1,3,5-triazine and 1,2-bis-(3-aminopropylamino)ethane,
(42) a reaction product of 7,7,9,9-tetramethyl-2-cycloundecyl-1-oxa-3,8-diaza-4-oxospiro [4,5]decane and epichlorohydrin,
(43) poly[methyl,(3-oxy-(2,2,6,6-tetramethylpiperidin-4-yl) propyl)] siloxane, CAS #182635-99-0,
(44) reaction product of maleic acid anhydride-$C_1$-$C_{22}$-α-olefin-copolymer with 2,2,6,6-tetramethyl-4-aminopiperidine,
(45) oligomeric condensate of 4,4'-hexamethylenebis (amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine,
(46) oligomeric condensate of 4,4'-hexamethylenebis (amino-1,2,2,6,6-pentaamethyl-piperidine) and 2,4-dichloro-6-[(1,2,2,6,6-pentaamethylpiperidin-4-yl)butylamino]-s-triazine end-capped with 2-chloro-4,6-bis(dibutylamino)-s-triazine,
(47) oligomeric condensate of 4,4'-hexamethylenebis (amino-1-propoxy-2,2,6,6-tetramethyl piperidine) and 2,4-dichloro-6-[(1-propoxy-2,2,6,6-tetramethylpiperidin-4-yl)butylamino]-s-triazine end-capped with 2-chloro-4,6-bis(dibutylamino)-s-triazine,
(48) oligomeric condensate of 4,4'-hexamethylenebis (amino-1-acyloxy-2,2,6,6-tetramethyl piperidine) and 2,4-dichloro-6-[(1-acyloxy-2,2,6,6-tetramethylpiperidin-4-yl)butylamino]-s-triazine end-capped with 2-chloro-4,6-bis(dibutylamino)-s-triazine and
(49) product obtained by reacting (a) with (b) where (a) is product obtained by reacting 1,2-bis(3-aminopropylamino)ethane with cyanuric chloride and (b) is (2,2,6,6-tetramethyl piperidin-4-yl)butylamine.

Also included are the sterically hindered N—H, N-methyl, N-hydroxy and N-acyloxy analogues of any of the above mentioned compounds. For example, replacing an N—H hindered amine with an N-methyl hindered amine would be employing the N-methyl analogue in place of the N—H.

For illustrative purposes, some of the structures for the above-named compounds are shown below.
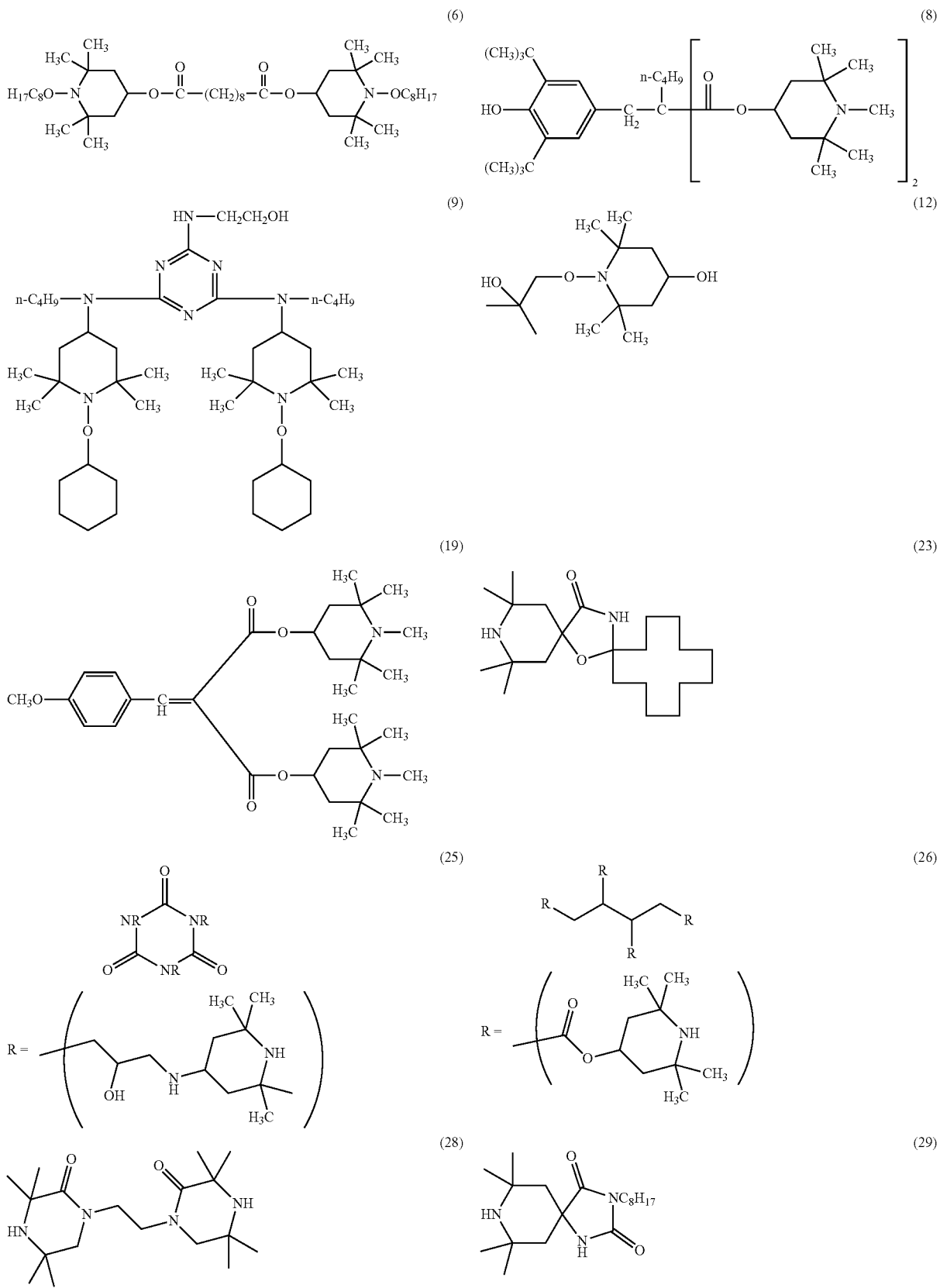

-continued
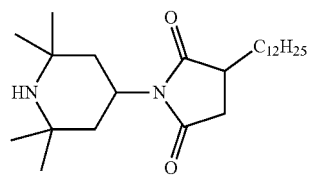
(15)
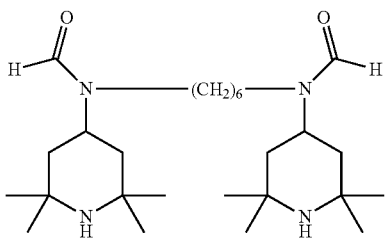
(31)
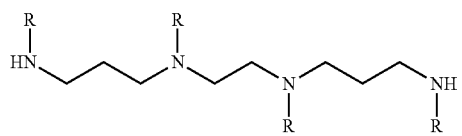
(33)
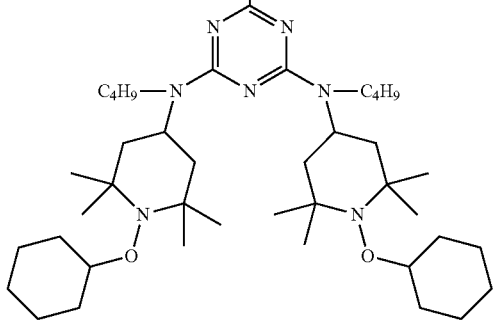
(34)
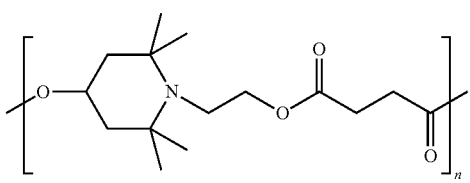
(35)
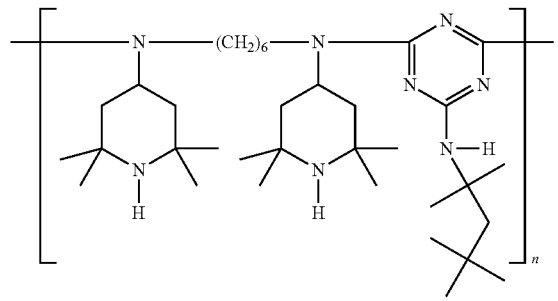
(36)
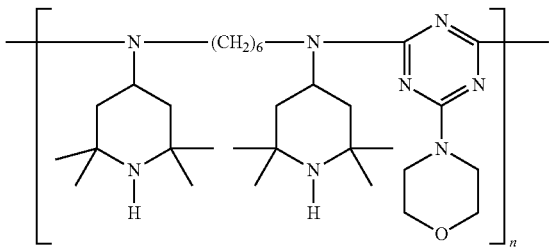
(38)
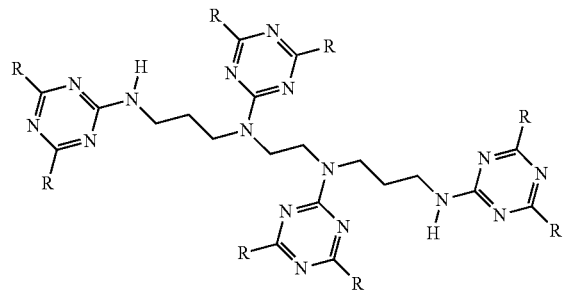
(41)
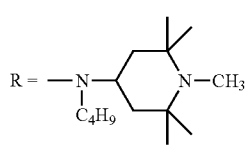
(42)

-continued

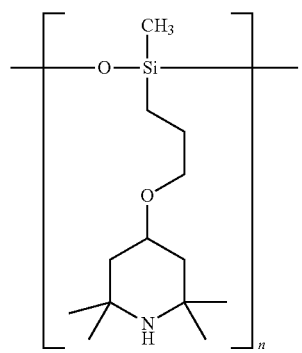

(43)

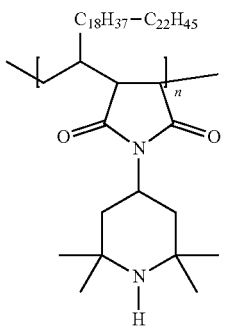

(44)

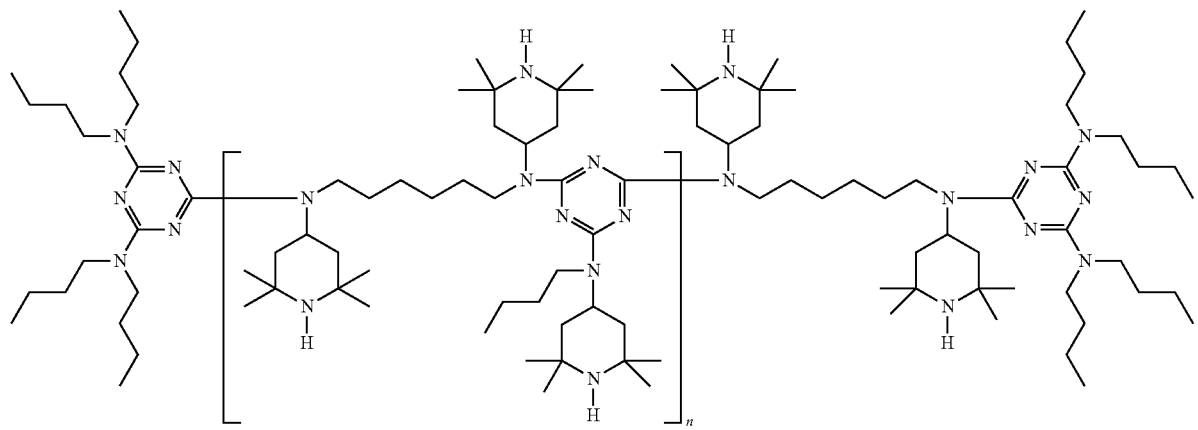

(45)

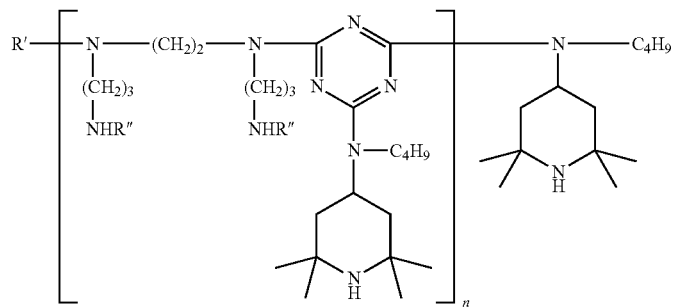

(49)

where R' = R" or H
n = 2 or 3
and where R" =

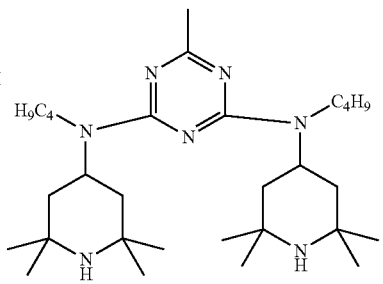

In some embodiments, hindered amine light stabilizers may be selected from a group consisting of
(2) bis(2,2,6,6-tetramethylpiperidin-4-yl) sebacate,
(20) 2,2,6,6-tetramethylpiperidin-4-yl octadecanoate,
(14) 1-(2-hydroxy-2-methylpropoxy)-4-octadecanoyloxy-2,2,6,6-tetramethylpiperidine,
(33) N,N'-bis-formyl-N,N'-bis(2,2,6,6-tetramethyl-4-piperidyl)hexamethylenediamine,
(36) condensate of N,N'-bis(2,2,6,6-tetramethyl-4-piperidyl)-hexamethylenediamine and 4-tert-octylamino-2,6-dichloro-1,3,5-triazine,
(38) condensate of N,N'-bis-(2,2,6,6-tetramethyl-4-piperidyl)hexamethylenediamine and 4-morpholino-2,6-dichloro-1,3,5-triazine,
(39) condensate of N,N'-bis-(1,2,2,6,6-pentamethyl-4-piperidyl)hexamethylenediamine and 4-morpholino-2,6-dichloro-1,3,5-triazine,

(44) reaction product of maleic acid anhydride-$C_{18}$-$C_{22}$-L-olefin-copolymer with 2,2,6,6-tetramethyl-4-aminopiperidine,
(45) oligomeric compound condensate of 4,4'-hexamethylenebis(amino-2,2,6,6-tetramethyl piperidine) and 2,4-dichloro-6-[(2,2,6,6-tetramethylpiperidin-4-yl)butylamino]-s-triazine end-capped with 2-chloro-4,6-bis(dibutylamino)-s-triazine,
(47) oligomeric compound condensate of 4,4'-hexamethyenebis(amino-1-propoxy-2,2,6,6-tetramethylpiperidine) and 2,4-dichloro-6-[(1-propoxy-2,2,6,6-tetramethylpiperidin-4-yl)butylamino]-s-triazine end-capped with 2-chloro-4,6-bis(dibutylamino)-s-triazine and binary or ternary combinations thereof.

Certain binary or ternary combinations of hindered amine light stabilizers may be advantageous. For instance, binary or ternary combinations:
(2) bis(2,2,6,6-tetramethylpiperidin-4-yl) sebacate and
(36) condensate of N,N'-bis(2,2,6,6-tetramethyl-4-piperidyl)-hexamethylenediamine and 4-tert-octylamino-2,6-dichloro-1,3,5-triazine;
(2) bis(2,2,6,6-tetramethylpiperidin-4-yl) sebacate and
(45) oligomeric compound condensate of 4,4'-hexamethylenebis(amino-2,2,6,6-tetramethyl piperidine) and 2,4-dichloro-6-[(2,2,6,6-tetramethylpiperidin-4-yl)butylamino]-s-triazine end-capped with 2-chloro-4,6-bis(dibutylamino)-s-triazine;
(20) 2,2,6,6-tetramethylpiperidin-4-yl octadecanoate and
(45) oligomeric condensate of 4,4'-hexamethylenebis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine;
(2) bis(2,2,6,6-tetramethylpiperidin-4-yl) sebacate and
(20) 2,2,6,6-tetramethylpiperidin-4-yl octadecanoate; or
(2) bis(2,2,6,6-tetramethylpiperidin-4-yl) sebacate,
(14) 1-(2-hydroxy-2-methylpropoxy)-4-octadecanoyloxy-2,2,6,6-tetramethylpiperidine and
(36) condensate of N,N'-bis(2,2,6,6-tetramethyl-4-piperidyl)-hexamethylenediamine and 4-tert-octylamino-2,6-dichloro-1,3,5-triazine.

In some embodiments, HALS (38) or (39) may be substituted for HALS (36) in the binary and ternary combinations.

Many of the present hindered amine stabilizers are commercial, for example TINUVIN 770, CHIMASSORB 944, CHIMASSORB 2020, CYASORB UV 3853, CYASORB UV 3529, TINUVIN NOR 371, UVINUL 4050, UVINUL 5050, etc.

In the binary HALS combinations, the weight/weight ratio is from any of about 1/19, about 1/18, about 1/17, about 1/16, about 1/15, about 1/14, about 1/13, about 1/12, about 1/11, about 1/10, about 1/9, about 1/8, about 1/7, about 1/6, about 1/5, about 1/4, about 1/3, about 1/2 or about 1/1 to any of about 1/2, about 1/3, about 1/4, about 1/5, about 1/6, about 1/7, about 1/8, about 1/9, about 1/10, about 1/11, about 1/12, about 1/13, about 1/14, about 1/15, about 1/16, about 1/17, about 1/18, about 1/19 or about 1/20.

In ternary HALS combinations, a weight/weight ratios of any two of the HALS is as for the binary combinations.

In some embodiments, a combination of a low molecular weight and a high molecular weight HALS may be employed. The low molecular weight stabilizers have a molecular weight of from about 200 g/mol to about 1000 g/mol. The high molecular weight stabilizers have a molecular weight from about 1200 g/mol to about 10,000 g/mol.

Some low molecular weight hindered amines are (1)-(33a). Some high molecular weight hindered amines are (34)-(49). In oligomeric or polymeric hindered amines, the repeating unit "n" is a value such that the average molecular weight is from about 1200 g/mol to about 10,000 g/mol.

In some embodiments, a low and high molecular weight hindered amine combination is employed together with a UV absorber, for instance an hydroxybenzoate UV absorber.

Further hindered amine light stabilizers may be present from any of about 0.1 wt %, about 0.2 wt %, about 0.3 wt %, about 0.4 wt %, about 0.5 wt %, about 0.6 wt %, about 0.7 wt %, about 0.8 wt %, about 0.9 wt % to any of about 1.0 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt % or about 2.0 wt %, based on the total weight of the finished article.

Antioxidants may be selected from a group consisting of hindered phenolic antioxidants, organophosphorus stabilizers, dialkylhydroxylamine stabilizers, amine oxide stabilizers and tocopherols. In some embodiments, antioxidants include a combination of an organophosphorus stabilizer and a hindered phenolic antioxidant, a dialkylhydroxylamine stabilizer, a combination of an organophosphorus stabilizer and a dialkylhydroxylamine stabilizer, an amine oxide stabilizer or a combination of an organophosphorus stabilizer and an amine oxide stabilizer.

Antioxidants also include vitamin E and vitamin E acetate (tocopherols). Each may be employed alone, in combination with each other or in combination with one or more antioxidants selected from the group consisting of hindered phenolic antioxidants, dialkylhydroxylamine stabilizers, organophosphorus stabilizers and amine oxide stabilizers.

Organophosphorus stabilizers are for example known phosphite and phosphonite stabilizers and include triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, bis(2,4-di-α-cumylphenyl) pentaerythritol diphosphite, diisodecyl pentaerythritol diphosphite, bis(2,4-di-tert-butylphenyl) pentaerythritol diphosphite (D), bis(2,6-di-tert-butyl-4-methylphenyl) pentaerythritol diphosphite (E), bisisodecyloxy-pentaerythritol diphosphite, bis(2,4-di-tert-butyl-6-methylphenyl) pentaerythritol diphosphite, bis(2,4,6-tri-tert-butylphenyl) pentaerythritol diphosphite, tristearyl sorbitol triphosphite, tetrakis (2,4-di-tert-butylphenyl) 4,4'-biphenylene-diphosphonite (H), 6-isooctyloxy-2,4,8,10-tetra-tert-butyl-dibenzo[d,f][1,3,2]dioxaphosphepin (C), 6-fluoro-2,4,8,10-tetra-tert-butyl-12-methyl-dibenzo[d,g][1,3,2]dioxaphosphocin (A), bis(2,4-di-tert-butyl-6-methylphenyl) methyl phosphite, bis(2,4-di-tert-butyl-6-methylphenyl) ethyl phosphite (G), 2,2',2''-nitrilo[triethyltris(3,3'5,5'-tetra-tert-butyl-1,1'-biphenyl-2,2'-diyl) phosphite] (B), bis(2,4-di-t-butylphenyl) octylphosphite, poly(4,4'-(2,2'-dimethyl-5,5'-di-t-butylphenylsulfide-)octylphosphite), poly(4,4'{-isopropylidenediphenol}-octylphosphite), poly(4,4'-{isopropylidenebis[2,6-dibromophenol]}-octylphosphite), poly(4,4'-{2,2'-dimethyl-5,5'-di-t-butylphenylsulfide}-pentaerythrityl diphosphite),

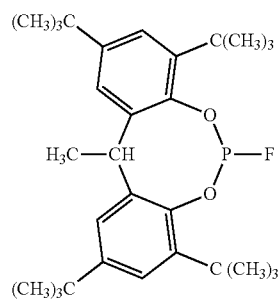
(A)
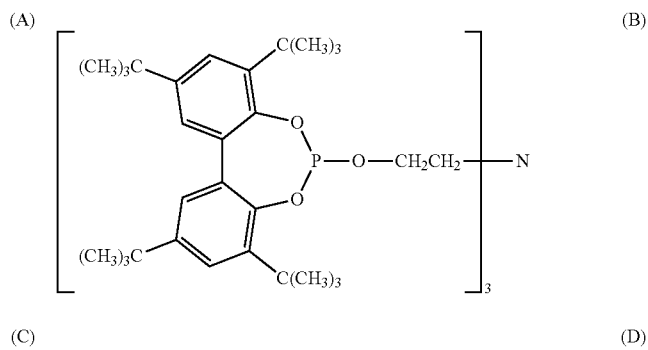
(B)
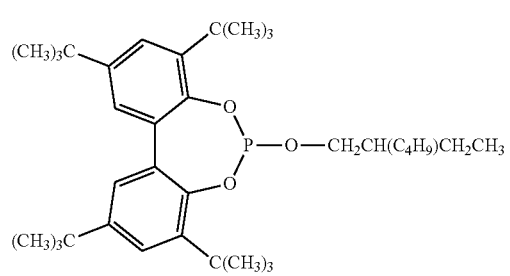
(C)
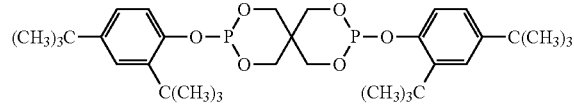
(D)
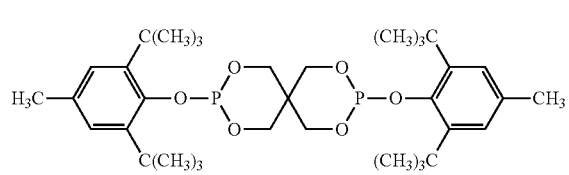
(E)
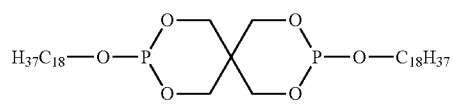
(F)
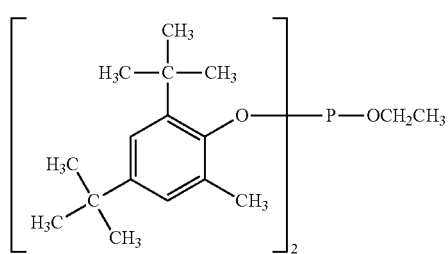
(G)
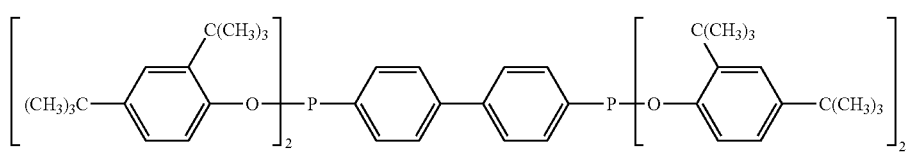
(H)
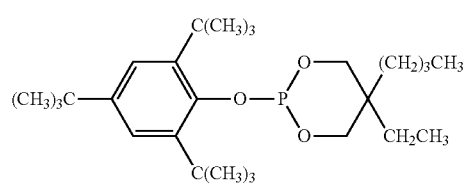
(J)
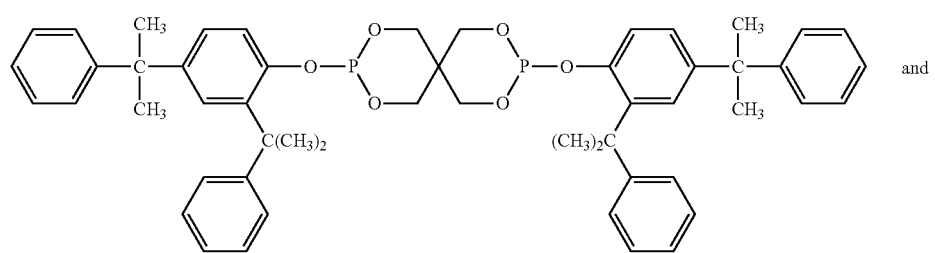
(K)

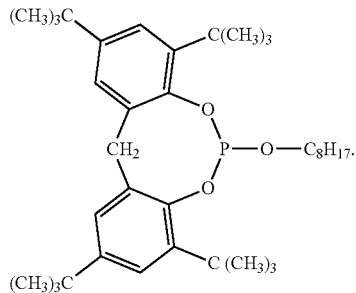

(L)

Suitable organophosphorus stabilizers are also liquid stabilizers as disclosed in U.S. Pub. No. 2010/048782 and U.S. Pat. No. 7,888,414, for example liquid phosphites P-2, P-3 and P-4 therein. Suitable liquid organophosphorus stabilizers are also disclosed in U.S. Pub. Nos. 2013/0225736 and 2010/0029844 and U.S. Pat. Nos. 7,468,410 and 8,304,477.

Hindered phenolic antioxidants include for example tris (3,5-di-tert-butyl-4-hydroxybenzyl) isocyanurate, 1,3,5-tris-(3,5-di-tert-butyl-4-hydroxybenzyl)-2,4,6-trimethylbenzene, the calcium salt of the monoethyl ester of 3,5-di-tert-butyl-4-hydroxybenzylphosphonic acid, pentaerythritol tetrakis [3-(3,5-di-tert-butyl-4-hydroxyphenyl) propionate] or octadecyl 3-(3,5-di-tert-butyl-4-hydroxyphenyl) propionate.

A combination of an organophosphorus stabilizer and a hindered phenolic antioxidant may be tris(2,4-di-tert-butylphenyl) phosphite and pentaerythritol tetrakis [3-(3,5-di-tert-butyl-4-hydroxyphenyl) propionate] or octadecyl 3-(3,5-di-tert-butyl-4-hydroxyphenyl) propionate.

A weight/weight ratio of organophosphorus stabilizer to hindered phenolic antioxidant may be from any of about 9/1, about 8/1, about 7/1, about 6/1, about 5/1, about 4/1, about 3/1, about 2/1 or about 1/1 to any of about 1/2, about 1/3, about 1/4, about 1/5, about 1/6, about 1/7, about 1/8 or about 1/9.

Hydroxylamine stabilizers are for example N,N-dibenzylhydroxylamine, N,N-diethylhydroxylamine, N,N-dioctylhydroxylamine, N,N-dilaurylhydroxylamine, N,N-didodecylhydroxylamine, N,N-ditetradecylhydroxylamine, N,N-dihexadecylhydroxylamine, N,N-dioctadecylhydroxylamine, N-hexadecyl-N-tetradecylhydroxylamine, N-hexadecyl-N-heptadecyihydroxylamine, N-hexadecyl-N-octadecylhydroxylamine, N-heptadecyl-N-octadecylhydroxylamine, N-methyl-N-octadecylhydroxylamine or N,N-di($C_{16}$-$C_{18}$alkyl)hydroxylamine.

The amine oxide stabilizer is for instance a di($C_{16}$-$C_{18}$) alkyl methyl amine oxide, CAS #204933-93-7.

A combination of an organophosphorus stabilizer and a dialkylhydroxyamine is for example tris(2,4-di-tert-butylphenyl) phosphite and N,N-di($C_{16}$-$C_{18}$alkyl)hydroxylamine.

A combination of an organophosphorus stabilizer and an amine oxide stabilizer is for example tris(2,4-di-tert-butylphenyl) phosphite and di($C_{16}$-$C_{18}$)alkyl methyl amine oxide.

A weight/weight ratio of these combinations may be from any of about 9/1, about 8/1, about 7/1, about 6/1, about 5/1, about 4/1, about 3/1, about 2/1 or about 1/1 to any of about 1/2, about 1/3, about 1/4, about 1/5, about 1/6, about 1/7, about 1/8 or about 1/9.

Antioxidants may be present, in total, from any of about 0.10 wt %, about 0.20 wt %, about 0.30 wt %, about 0.40 wt %, about 0.50 wt % or about 0.60 wt % to any of about 0.70 wt %, about 0.80 wt %, about 0.90 wt % or about 1.0 wt %, based on the total weight of the hollow article.

Colorants, pigments or fillers may also be added to the present polyolefin substrates.

Pigments include inorganic pigments, such as titanium dioxide in its three crystalline forms: rutile, anatase, or brookite, ultramarine blue, iron oxides, bismuth vanadates, carbon black, effect pigments including metallic pigments such as aluminum flake and pearlescent pigments such as micas, and organic pigments, for example phthalocyanines, perylenes, azo compounds, isoindolines, quinophthalones, diketopyrrolopyrroles, quinacridones, dioxazines, and indanthrones. Pigments may be included singly or in any combination in amounts typically of up to about 5% by weight, based on the total weight of the article. Dyes are any of the colorants which dissolve completely in the plastic used or are present in molecularly dispersed form and therefore can be used to provide high-transparency, non-diffusion coloring of polymers. Other dyes are organic compounds which fluoresce in the visible portion of the electromagnetic spectrum, e.g. fluorescent dyes. Dyes may be included singly or in any combination in amounts typically of up to about 5% by weight, based on the total weight of the article.

Particulate fillers may be present in an amount from any of about 0.01 wt %, about 0.1 wt %, about 1 wt %, about 5 wt %, about 10 wt %, about 15 wt % or about 20 wt % to any of about 25 wt %, about 30 wt %, about 35 wt %, about 40 wt %, about 45 wt % or about 50 wt %, based on the total weight of the article. Fillers include but are not limited to titanium dioxide, silicon carbide, silica (and other oxides of silica, precipitated or not), antimony oxide, lead carbonate, zinc white, lithopone, zircon, corundum, spinel, apatite, barytes powder, barium sulfate, carbon black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, clays, alumina, and other metal oxides and carbonates, metal hydroxides, chrome, phosphorous, antimony trioxide, silica, silicone, and blends thereof. These fillers may include any other fillers and porous fillers and supports known in the art.

Still further additives may be incorporated into the polyolefin substrate, for instance additives such as anti-static agents (antistats), antiscratch additives, slip agents, polymer processing aids, etc. (see Plastic Additives Handbook; 6 Edition). Included are metal salts of fatty acids, for example, calcium, magnesium, zinc, or aluminum stearate. Further additives also include thiosynergists, for example dilauryl thiodipropionate or distearyl thiodipropionate. Further additives also include benzofuranone stabilizers, for example those disclosed in U.S. Pat. Nos. 4,325,863, 4,338,244, 5,175,312, 5,216,052, 5,252,643, 5,369,159, 5,356,966, 5,367,008, 5,428,177 or 5,428,162 or U.S. Patent App. Pub. No. 2012/0238677, including 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2-acetyl-5-isooctylphenyl)-5-isooctylbenzofuran-2-one and 3-(2,3-dimethylphenyl)-5,7-di-tert-butyl-benzofuran-2-one. Further additives also include compatibilizers or dispersing aids, for example, maleic anhydride grafted PE or PP, poly(ethylene-co-vinyl acetate), poly(ethylene-acrylic acid), etc. The further additives may be present from any of about 0.1 wt %, 0.2 wt %, about 0.5 wt %, about 0.7 wt % or about 1.0 wt % to any of about 1.5 wt %, about 2.0 wt %, about 2.5 wt %, about 3.0 wt %, about 3.5 wt %, about 4.0 wt %, about 4.5 wt % or about 5.0 wt %, based on a total weight of the article.

Rotomolding (rotational molding) is used for the production of fairly large plastic hollow articles which may be reinforced with glass fibers. The process includes filling one half of a mold with the plastic material. The mold is then closed with the other half and heated and rotated in an oven such that the molten plastic spreads to the walls of the mold while being rotated around different axes. The hollow article is obtained after cooling. In this manner it is possible to produce, for example, storage tanks from HD polyethylene. In some embodiments, the process requires heating a polyolefin mixture to temperatures in the range of from any of about 170° C., about 190° C., about 210° C., about 230° C., about 240° C., about 260° C. or about 280° C. to any of about 300° C., about 340° C. to about 37° C. or about 400° C. or higher. These temperatures represent the peak internal air temperature (PIAT) of an oven.

Incorporation of the phosphonate ester, N-alkoxy hindered amine, melamine cyanurate (present additives) and optional further additives into the polyolefin substrate is carried out by known methods, for example before or after molding or also by applying the dissolved or dispersed additive mixture to the polyolefin, with or without subsequent evaporation of the solvent. Present additives can also be added to the polyolefin in the form of a masterbatch which contains the additives in a concentration of, for example, about 2.5% to about 40% by weight, based on the total weight of the masterbatch. In the form of a masterbatch, the polymer of the masterbatch need not be the same as the polyolefin substrate.

Molding is carried out with known mixing machines, for instance mixers, kneaders or extruders. Present additives and optional further additives can be premixed or added individually. Present additives and optional further additives can also be added before or during the polymerization or before crosslinking. Present additives and optional further additives can be incorporated into the polymer to be made flame retardant in pure form or encapsulated in waxes, oils or polymers.

Present additives and optional further additives can also be sprayed onto the polyolefin substrate. They are able to dilute other additives or their melts so that they can be sprayed also together with these additives onto the polyolefin. Addition by spraying during the deactivation of the polymerization catalysts may be advantageous, it being possible to carry out spraying using, for example, the steam used for deactivation.

In some embodiments, a present process includes the measurement of raw materials by weight followed by dry blending of the ingredients. In certain embodiments, the present additives and optional further additives are incorporated into the thermoplastic polyolefin substrate by melt blending in an extruder. The present additives and optional additives may be added together or separately. In some embodiments, the term "incorporating into a polyolefin" means melt blending, that is, subjecting a mixture to melt conditions at an elevated temperature.

A mixture may be fed to a melt mixing device such as an extruder at a constant feed rate to extrude the material into a desired form, for example pellets. The pellets are a "fully formulated polyolefin substrate". The pellets may be ground to a small, generally uniform particle size, for example to an average particle size of from about 150 microns to about 500 microns prior to rotomolding.

The fully formulated polyolefin particles are filled into one half of a mold which is then closed with the other half. Molds are typically made of aluminum or steel. The closed mold is heated and rotated around different axes, wherein molten polymer coats the interior of the mold—a process referred to as "sintering". The mold is then cooled and the molded article removed.

In addition to storage tanks, many other articles may be manufactures with a rotomolding process, for example kayaks, toys, refuse containers, equipment housings, etc.

Rotomolded articles may in many cases have a relatively large average wall thickness. In some embodiments, present rotomolded articles have an average wall thickness of ≥about 1.50 mm, ≥about 1.75 mm, ≥about 2.00 mm, t about 2.25 mm, ≥about 2.50 mm, a about 2.75 mm, ≥about 3.00 mm, ≥about 3.25 mm, t about 3.50 mm, ≥about 3.75 mm, a about 4.00 mm, a about 4.25 mm, ≥about 4.50 mm or ≥about 4.75 mm. In some embodiments, rotomolded articles have an average wall thickness of from any of about 1.50 mm, about 1.75 mm, about 2.00 mm, about 2.25 mm, about 2.50 mm, about 2.75 mm or about 3.00 mm to any of about 3.25 mm, about 3.50 mm, about 3.75 mm, about 4.00 mm, about 4.25 mm, about 4.50 mm, about 4.75 mm, about 5.00 mm, about 5.25 mm, about 5.50 mm, about 5.75 mm or about 6.00 mm.

In some embodiments, present rotomolded articles achieve a V-0 rating according to the UL-94 V test. Ratings for the UL-94 V test are listed below; UL-94 Test for Flammability of Plastic Materials for Parts in Devices and Appliances, 5th Edition, Oct. 29, 1996. In some embodiments, present rotomolded articles having an average wall thickness of 125 mil (3.175 mm) achieve a V-0 rating.

| Rating | Afterflame time | Burning drips | Burn to Clamp |
|---|---|---|---|
| V-0 | <10 s | no | no |
| V-1 | <30 s | no | no |
| V-2 | <30 s | yes | no |
| Fail (NR) | <30 s | | yes |
| Fail (NR) | >30 s | | no |

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±5%, ±4%, ±3%, ±2%, ±1%, ±0.5%, ±0.4%, ±0.3%, ±0.2%, ±0.1% or ±0.05%. All numeric values are modified by the term "about" whether or not explicitly indicated. Numeric values modified by the term "about" include the specific identified value. For example "about 5.0" includes 5.0.

U.S. patents, U.S. patent applications and published U.S. patent applications discussed herein are hereby incorporated by reference.

Unless otherwise indicated, all parts and percentages are by weight. Weight percent (wt %), if not otherwise indicated, is based on an entire composition free of any volatiles.

Example 1

Additives are dry blended with low density polyethylene (LDPE, 0.935 g/cm³) to provide the formulations in the table below. Additive levels are reported in parts by weight, based on 100 parts polyethylene. The dry blends are melt extruded into pellets. Compression molding (CM) is performed at 400° F. Injection molding (IM) is performed at 410° C. For rotomolding (RM), pellets are ground to 35 mesh and placed in a laboratory scale FST M20 "clamshell" aluminum mold, which is rotated biaxially in a gas-fired oven. Hot air is circulated by blowers in the chamber while the temperature is increased to 288° C. over 16 minutes to provide a peak internal air temperature of 204° C. The temperature is maintained for 20 minutes. The oven is opened and is cooled over 24 minutes while still rotating. The mold is opened and the hollow article is removed.

Results of flame retardancy according to UL-94 are also found in the table below. Each test is performed in quadruplicate. All samples are 125 mil thick (3.175 mm). Additive "Ph ester" is a phosphonate ester wherein $R_1$ and $R_2$ are methyl. MC is melamine cyanurate with an average particle size of less than 15 microns. NOR is 1-(2-hydroxy-2-methylpropoxy)-4-octadecanoyloxy-2,2,6,6-tetramethylpiperidine. The LDPE contains a base stabilization of 500 ppm of pentaerythritol tetrakis [3-(3,5-di-tert-butyl-4-hydroxyphenyl) propionate] (phenolic antioxidant), 1200 ppm tris (2,4-di-tert-butylphenyl) phosphite (organophosphorus stabilizer) and 500 ppm N,N-di($C_{16}$-$C_{18}$alkyl)hydroxylamine (hydroxylamine stabilizer), wherein ppm (parts per million) is based on the weight of polyethylene.

| sample | additive(s) | method | UL 94 rating |
|---|---|---|---|
| 1 | 12 Ph ester/4 MC/1 NOR | CM | V-2 |
| 2 | 12 Ph ester/7 MC/1 NOR | CM | V-2 |
| 3 | 12 Ph ester/4 MC/2 NOR | CM | V-0 |
| 4 | 12 Ph ester/4 MC/1 NOR | IM | V-2 |
| 5 | 12 Ph ester/4 MC/1 NOR | RM | V-0 |
| 6 | 12 Ph ester/4 MC/2 NOR | RM | V-0 |

The invention claimed is:

1. A flame-retardant plastic article comprising a polyolefin substrate and additives incorporated in the polyolefin substrate, the polyolefin substrate comprising a low density polyethylene, the additives comprising:
   i) a phosphonate ester;
   ii) an N-alkoxy hindered amine;
   iii) melamine cyanurate; and
   iv) a base stabilization combination comprising pentaerythritol tetrakis [3-(3,5-di-tert-butyl-4-hydroxyphenyl)propionate], tris(2,4-di-tert-butylphenyl) phosphite and N,N-di($C_{16}$-$C_{18}$alkyl)hydroxylamine,
   wherein the plastic article contains a hollow portion therein, and
   wherein the article has an average wall thickness of from about 1.50 mm to about 6.00 mm.

2. The plastic article according to claim 1, wherein the phosphonate ester is of formula

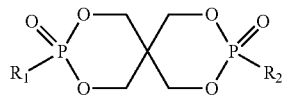

wherein $R_1$ and $R_2$ are independently alkyl, substituted alkyl, aralkyl, substituted aralkyl, aryl or substituted aryl.

3. The plastic article according to claim 1, wherein the N-alkoxy hindered amine contains one or more moieties of formula

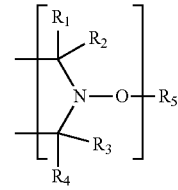

wherein $R_1$, $R_2$, $R_3$ and $R_4$ are each independently $C_1$-$C_8$alkyl or $R_1$ and $R_2$ together and/or $R_3$ and $R_4$ together with the linking carbon form cyclohexyl and $R_5$ is a hydrocarbyl group.

4. The plastic article according to claim 1, wherein the N-alkoxy hindered amine is selected from a group consisting of formula (1) through (9):

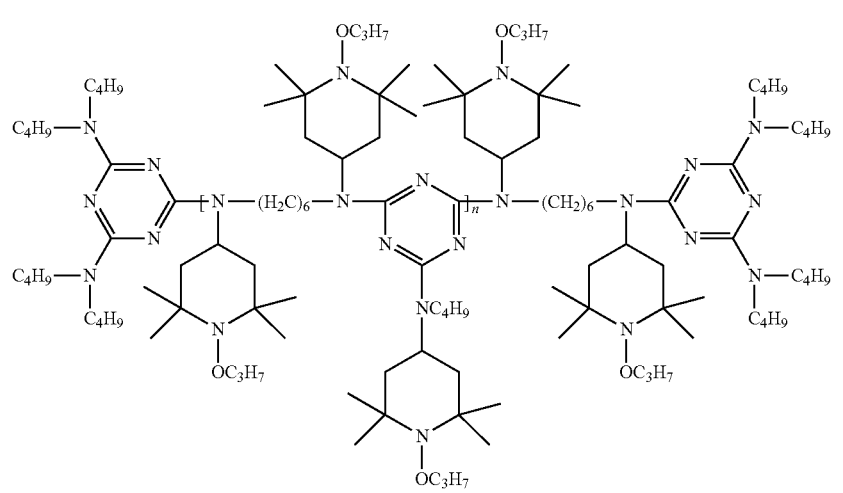
wherein n is an integer from 1 to 15 or is an integer from 1 to 10 or from 1 to 5,
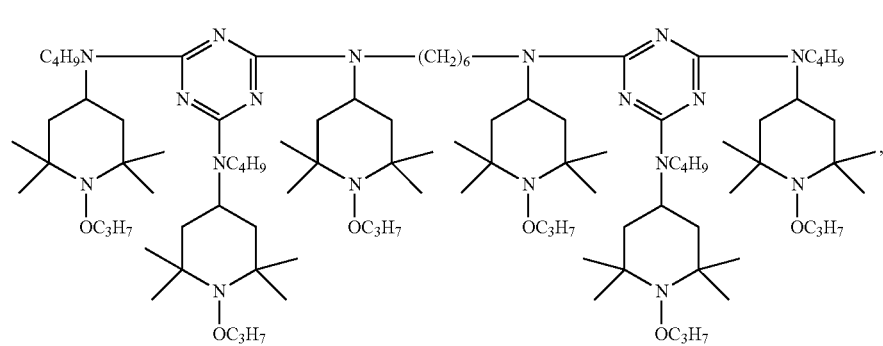
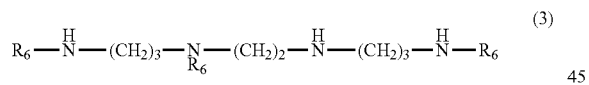
wherein $R_6$ is a group of formula,
wherein * is the point of attachment,
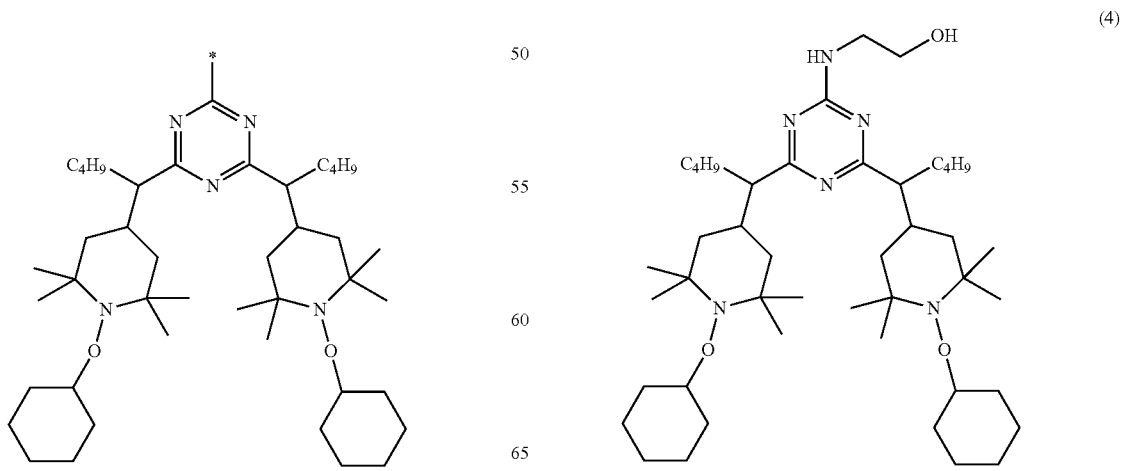

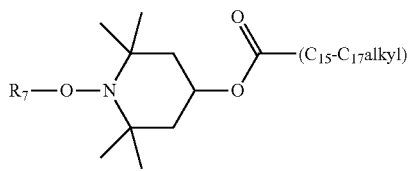

wherein $R_7$ is $C_1$-$C_{18}$alkyl or $C_1$-$C_{18}$hydroxyalkyl,

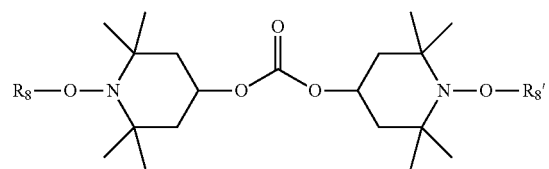

wherein $R_8$ and $R_8'$ are independently $C_1$-$C_{30}$alkyl,

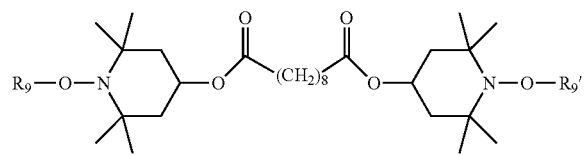

wherein $R_9$ and $R_9'$ are independently $C_1$-$C_{30}$alkyl or cylclohexyl,

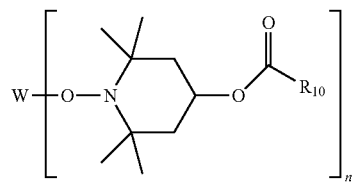

wherein
n is an integer of from any of 1, 2, 3 or 4 to any of 5, 6, 7, 8, 9 or 10,
$R_{10}$ is $C_1$-$C_{40}$alkyl and
W is a hydrocarbyl containing from 50 to 1000 carbon atoms, and

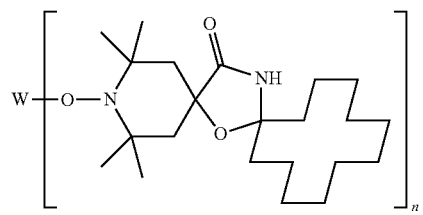

wherein
n is an integer from any of 1, 2, 3, 4, 5, 6, 7 or 8 to any of 9, 10, 11, 12, 15, 18, 21, 24, 27, 30, 33, 36, 39, 42, 45, 47 or 50 and
W is a hydrocarbyl containing from 50 to 1000 carbon atoms.

5. The plastic article according to claim 1, wherein the melamine cyanurate has an average particle size of from about 1 micron to about 50 microns.

6. The plastic article according to claim 1, wherein the article comprises from about 50 wt % to about 95 wt % polyolefin, based on the total weight of the article.

7. The plastic article according to claim 1, wherein the article comprises from about 4 wt % to about 20 wt % phosphonate ester, based on the total weight of the article.

8. The plastic article according to claim 1, wherein the article comprises from about 0.1 wt % to about 5.0 wt % N-alkoxy hindered amine, based on the total weight of the article.

9. The plastic article according to claim 1, wherein the article comprises from about 1.0 wt % to about 10.0 wt % melamine cyanurate, based on the total weight of the article.

10. The plastic article according to claim 1, wherein the article further comprises one or more additives selected from a group consisting of ultraviolet light absorbers, further hindered amines and antioxidants.

11. The plastic article according to claim 1, wherein the article comprises from about 0.1 wt % to about 50 wt % of one or more fillers, based on the total weight of the article.

12. The plastic article according to claim 1, wherein the article exhibits a UL-94 rating of V-0 wherein an average wall thickness is about 3.2 mm.

13. The plastic article according to claim 1, wherein a weight/weight ratio of i) phosphonate ester to iii) melamine cyanurate is from 1/1 to 7/1 and a weight/weight ratio of iii) melamine cyanurate to ii) N-alkoxy hindered amine is from 1/1 to 8/1.

* * * * *